United States Patent
Tobin et al.

(10) Patent No.: US 10,674,739 B2
(45) Date of Patent: Jun. 9, 2020

(54) METHOD FOR PROCESSING ANIMAL SKIM MILK

(71) Applicant: N.V. Nutricia, Zoetermeer (NL)

(72) Inventors: John Tobin, Mitchelstown (IE); Rudolph Eduardus Maria Verdurmen, Utrecht (NL)

(73) Assignee: N.V. NUTRICIA, Zoetermeer (NL)

( * ) Notice: Subject to any disclaimer, the term of this patent is extended or adjusted under 35 U.S.C. 154(b) by 328 days.

(21) Appl. No.: 15/022,815

(22) PCT Filed: Sep. 19, 2014

(86) PCT No.: PCT/NL2014/050643
§ 371 (c)(1),
(2) Date: Mar. 17, 2016

(87) PCT Pub. No.: WO2015/041529
PCT Pub. Date: Mar. 26, 2015

(65) Prior Publication Data
US 2016/0205960 A1    Jul. 21, 2016

(30) Foreign Application Priority Data
Sep. 19, 2013  (WO) ................ PCT/NL2013/050671

(51) Int. Cl.
*A23C 9/142* (2006.01)
*A23J 3/08* (2006.01)
*A23J 1/20* (2006.01)
*A23L 33/00* (2016.01)
*A23L 33/19* (2016.01)

(52) U.S. Cl.
CPC .......... *A23C 9/1425* (2013.01); *A23C 9/1427* (2013.01); *A23J 1/20* (2013.01); *A23J 1/202* (2013.01); *A23J 3/08* (2013.01); *A23L 33/19* (2016.08); *A23L 33/40* (2016.08); *A23C 2210/206* (2013.01); *A23C 2210/252* (2013.01); *A23V 2002/00* (2013.01)

(58) Field of Classification Search
CPC ........... A23C 9/1425; A23C 2210/206; A23C 2210/252; A23C 9/1427; A23J 1/20; A23J 1/202; A23J 3/08; A23L 33/19; A23L 33/40; A23L 1/296; A23V 2002/00
See application file for complete search history.

(56) References Cited

U.S. PATENT DOCUMENTS

| | | | |
|---|---|---|---|
| 5,169,666 A | 12/1992 | Woychik | |
| 5,503,865 A | 4/1996 | Behringer et al. | |
| 5,670,196 A | 9/1997 | Gregory | |
| 6,485,762 B1 | 11/2002 | Rizvi et al. | |
| 2006/0172058 A1* | 8/2006 | Achs ................. | A23C 9/1422 426/657 |
| 2007/0166447 A1 | 7/2007 | Ur-Rehman et al. | |
| 2009/0017176 A1 | 1/2009 | Sugawara et al. | |
| 2011/0097442 A1 | 4/2011 | Harju et al. | |
| 2013/0064923 A1* | 3/2013 | Remondetto ......... | A23C 9/158 426/2 |
| 2015/0093490 A1* | 4/2015 | Tobin .................. | A23C 9/1422 426/587 |

FOREIGN PATENT DOCUMENTS

| | | | |
|---|---|---|---|
| EP | 1 133 238 | 9/2001 | |
| EP | 2839749 A1 * | 2/2015 | ........... A23C 19/076 |
| FR | 2631785 A1 | 12/1989 | |
| NL | 2006662 | 10/2012 | |
| NZ | 511562 A | 10/2003 | |
| WO | WO-94/06306 | 3/1994 | |
| WO | WO-96/08155 A1 | 3/1996 | |
| WO | WO-00/30461 A1 | 6/2000 | |
| WO | WO-2008/127104 | 10/2008 | |
| WO | WO-2009/059266 A1 | 5/2009 | |
| WO | WO-2009/072884 A1 | 6/2009 | |
| WO | WO-2009/113845 A1 | 9/2009 | |
| WO | WO-2011/051557 A1 | 5/2011 | |
| WO | WO-2011/115498 A1 | 9/2011 | |
| WO | WO-2013/068653 A2 | 5/2013 | |
| WO | WO-2013/137714 A1 | 9/2013 | |

OTHER PUBLICATIONS

Baldasso et al. Desalinization (2011) 278: 381-386 (Year: 2011).*
Govindasamy-Lucey et al. J. Dairy Sci. (2007) 90: 4552-4568 (Year: 2007).*
Pouliot Int. Dairy Journal (2008) 18: 735-740 (Year: 2008).*
Machine Translation of EP 2839749 published Feb. 2015 downloaded from ProQuest (Year: 2015).*

(Continued)

*Primary Examiner* — Susan M Hanley
(74) *Attorney, Agent, or Firm* — Foley & Lardner LLP

(57) ABSTRACT

Claimed is the preparation of an infant formula base product, comprising: (a) microfiltration (ME) of animal skim milk over a membrane having a porosity of 0.10-0.35 micrometer and operating with a volume concentration factor of 1.5-8, resulting in a retentate (MFR) and a permeate (MFP); (b) ultrafiltration (UF) of the MEP originating from step (a) over a membrane having a molecular weight cut-off of at most 25 kDa and operating with a volume concentration factor of 1.5-8, resulting in a retentate (UFR) and a permeate fUEP); (c) combining the MFR from step (a) and the UFR from step (b), to obtain a defined casein/whey ratio. Alternatively, the product of step (a) is used as a protein source. Claimed is also a composition comprising 40-50 g casein, 30-40 g lactose and 5-16 g ash per 100 g dry weight.

21 Claims, No Drawings

(56) References Cited

OTHER PUBLICATIONS

Machine translation of FR 2631785 A1 published Dec. 1, 1989 downloaded from the EPO on Jan. 23, 2020 (Year: 1989).*
International Search Report issued in International Patent Application No. PCT/NL2014/050643, dated Apr. 15, 2015.
International Search Report issued in International Patent Application No. PCT/NL2012/050148, dated Dec. 5, 2012.

* cited by examiner

METHOD FOR PROCESSING ANIMAL SKIM MILK

CROSS-REFERENCE TO RELATED APPLICATIONS

This application is the National Phase of International Patent Application No. PCT/NL2014/050643, filed Sep. 19, 2014, published on Mar. 26, 2015 as WO 2015/041529 A2, which claims priority to International Patent Application No. PCT/NL2013/050671, filed Sep. 19, 2013. The contents of which are herein incorporated by reference in their entirety.

FIELD OF THE INVENTION

The invention relates to the treatment of animal skim milk, which is ideally suited for the preparation of infant formulae, infant formula base products and/or nutritional products suitable for feeding toddlers, as well as to products obtainable by such treatment.

BACKGROUND OF THE INVENTION

Human milk is considered the 'golden standard' for infant nutrition. Processing animal milk, for example cow's milk, to more resemble the composition of human milk is known in the art as 'humanizing' animal milk. The process of humanizing animal milk involves changing the ratio of casein:whey proteins as found in animal milk (e.g. approximately 80:20 for cow's milk) to the desired ratio for infant nutrition as found in human milk, for example between 75:25 and 30:70, or usually approximately 40/60, which is the ratio found in human milk in months 0-6 post-partem. In addition, the mineral content of animal milk is typically higher than the content found in human milk. Thus humanization of animal milk also involves reducing of the mineral content. Preparation of products suitable for use in infant nutrition typically involves blending of various individually purified components in the appropriate ratios, either wet or dry. Current manufacturing processes require multiple dairy ingredients from intermediate suppliers, including skim milk or a concentrate thereof, including skim milk powder, demineralised whey or a concentrate thereof, including demineralised whey powder, whey protein concentrates or isolates, normally as powders, and pure grade lactose, typically in powder form, to formulate a nutritionally balanced infant formula.

WO 96/08155 describes a process for treating skim milk for the manufacture of cheese and milk powders, wherein whey proteins are removed from skim milk by microfiltration (MF) and ultrafiltration (UF). Volume concentration factors of 20-100 are employed in the UF step. No recombination of the MF retentate and UF permeate is described for the preparation of infant formulae and no attention is given to the concentration of minerals and trace elements such as phosphorus.

U.S. Pat. No. 5,503,865 discloses a process for treating skim milk, comprising microfiltration or ultrafiltration. The permeate thereof may be demineralised by for example ion exchange and/or electrodialysis in order to make the skim milk product suitable to be used in infant formulae. No combination of filtration techniques is disclosed.

WO 2008/127104 discloses the production of whey protein serum comprising residual beta casein by subjecting cow's milk to microfiltration over a membrane with a pore size of 0.3-0.5 micrometer at a temperature from 10-20° C., optionally with a further concentration step. The enlarged porosity gives rise to undesirably high casein content in the whey stream.

The process of U.S. Pat. No. 5,169,666 uses even lower temperatures (4° C.) at which the microfiltration over membranes with a pore size of 0.1-0.2 micrometer is performed. At this temperature significant amounts of (beta-)casein dissociates from the casein micelles and ends up in the MF permeate. Apart from being undesirably high in casein, the MF permeate is also too high in ash to be suitable for use in infant formulae. No measures are described to further reduce the ash content.

EP 1133238 describes a process wherein animal milk is subjected to microfiltration through a membrane having a porosity of 0.1-0.2 micrometer, after which the MF permeate is demineralised by electrodialysis. The mineral content of the electrodialyzed MF permeate is very low, and subsequent fortification with minerals and trace elements is required to obtain an infant formula.

WO 2009/059266 describes a process for preparing casein from skim milk by microfiltration, using a MF membrane having a porosity of 20-200 kDa and a VCF of 5-6. UF of the MF permeate may be used to separate the whey protein fraction into α-lactalbumin and β-lactoglobulin.

WO 2013/068653 describes a process for treating skim milk for the manufacture of infant formula bases, comprising MF of milk and UF of the MF permeate. Volume concentration factors of 2-10 are employed in the MF step and of 10-80 in the UF step. The lactose containing UF permeate is subjected to nanofiltration (NF) and used without further mineral removal steps in the preparation of infant formula bases. Although not recognized by the authors, such process would give rise to a final product which has unacceptably high mineral content, in particular too much divalent ions, as those do not permeate the NF membrane. This is reflected in the exemplary infant formulae disclosed in tables 2-7 of WO 2013/068563, which all have an ash content of 0.34 wt % or higher, based on final liquid product, which is undesirably high.

There is a need in the art for a process that enables efficient and cost-effective preparation of infant nutritional products from animal skim milk, which circumvents the above-mentioned drawbacks, in particular with respect to cost demanding demineralization and drying steps and the mineral content of the final product.

SUMMARY OF THE INVENTION

The inventors have found that animal skim milk can be humanized by an efficient and cheap process, requiring minimal processing steps and enabling maximal use of the ingredients in animal skim milk.

The invention concerns a process for the preparation of an infant formula base product, comprising:
  (a) microfiltration (MF) of animal skim milk over a membrane having a porosity of 0.10-0.35 micrometer and operating with a volume concentration factor of 1.5-8, resulting in a retentate (MFR) and a permeate (MFP);
  (b) ultrafiltration (UF) of the MFP originating from step (a) over a membrane having a molecular weight cut-off of at most 25 kDa and operating with a volume concentration factor of 1.5-8, resulting in a retentate (UFR) and a permeate (UFP);

(c) combining the MFR originating from step (a) and the UFR originating from step (b), whereby a composition having a casein/whey protein weight ratio of 20/80-70/30 is obtained.

DETAILED DESCRIPTION OF THE INVENTION

Present day manufacturers of infant formula and base products for infant formula largely rely on supply and use of highly purified ingredients, such as purified lactose, demineralized whey proteins and minerals, to produce said compositions by mixing these sourced ingredients. The present inventors have designed a process for treating animal skim milk for manufacturing infant formula base products, which largely circumvents individual high-grade, pure ingredients.

The process of the present invention has several advantages over existing methods of producing infant formula base products, e.g. the loss in lactose yield and whey during the processing of skim milk and whey is reduced, for example during conventional demineralization of whey and crystallization of lactose, complications related to fouling of membranes and deposition of protein material are reduced, the use of additions of chemicals is reduced and waste water may be recycled in the process to a large extent. In particular, the process according to the present invention may be designed as a closed-loop process, in which hardly any waste is formed. As such, the amount of waste and waste streams is greatly reduced compared to the conventional process. In addition, the need for energy consuming drying and demineralization steps is reduced. More in particular, whereas lactose yield in conventional purification methods for the production of dairy products lies around 83-85%, the lactose yield can be improved to over 90% in the process of the present invention. Also, the yield of casein and whey proteins, as well as the yield of the minerals, could be increased to at least 90 wt %, or even above 95 wt %. Herein, the yield represents the amount of a component present in the incoming skim milk that is included in the final infant formula base products and/or other nutritional compositions for infant nutrition. Thus, the present process utilizes virtually all nutritional components of the animal skim milk. Hence, the process according to the invention has a lower environmental impact compared to the conventional process for producing infant formula base products.

The process according to the invention is ideally suited for the preparation of infant formula base products. In the context of the present invention, an "infant formula base product" is a liquid or powdered composition, suitable for making infant formulae or other nutritional compositions suitable for feeding infants. Preferably, the present process is for preparing base products for infant formulae, follow-on formulae or growing-up milks, which comprise all or almost all essential ingredients in the required amounts for infant nutrition. Compositions wherein one or more of the ingredients of an infant formula is present in too low amounts (i.e. is below target) is also considered an infant formula base product in the context of the present invention. The term "on target" is meant to indicate that the content of a specific component in a composition is such, that when an infant formula is manufactured from said composition, the content of that particular component is within the regulatory ranges of that component. Such legal requirements for infant formulae and infant formula base products are known to the skilled person, and are obtainable from for example the EFSA and/or the FDA (e.g. EU directive 91/321/EEC, or EU directive 2006/141/EC, US Food and Drug Administration 21 CFR Ch 1 part 107).

The process according to the invention employs cost-efficient membrane filtration techniques such as microfiltration (MF), ultrafiltration (UF), nanofiltration (NF) and reverse osmosis (RO). MF is known in the art to be any type of filtration over a membrane having a porosity of 0.1-10 micrometer. UF is known in the art to be any type of filtration over a membrane having a porosity of 1-100 nanometer or a molecular weight cut-off (MWCO) of approximately 5 kDa-approximately 500 kDa. NF is known in the art to be any type of filtration over a membrane having a MWCO below approximately 1000 Da, typically below 150 Da. RO is known in the art to be a filtration technique that allows the permeation of solvent molecules only while retaining all solutes. Each of these filtration steps may be enhanced with diafiltration (DF) as known in the art. These filtration steps partition an incoming liquid stream in a permeate and a retentate, whereby typically certain solutes become concentrated in the retentate, and others may permeate together with the solvent. The "volume concentration factor" or "VCF" is the factor at which a liquid composition is concentrated upon filtration, i.e. the total volume of the incoming stream prior to filtration divided by the total volume of the retentate after filtration, irrespective of the total solid content. Thus, when 5 L of a liquid composition is fractioned over an MF membrane into a permeate of 4 L and a retentate of 1 L, this MF process operates with a VCF of 5/1=5. VCFs are determined on the actual volume in the incoming stream, thus excluding optionally added DF water.

Whenever a certain composition is mentioned to "originate from" a certain process step, such as from the MFP originating from step (a), said composition can be the composition which is directly obtained by said process step, typically either as permeate or as retentate. In addition, if such a directly obtained composition undergoes one or more additional processing steps, such as partial evaporation and/or supplementation of additional water or other components, the composition is still regarded to originate from that specific process step. Thus, if the permeate of the MF of step (a) would be partially evaporated prior to it is entered in the UF of step (b), the incoming stream of the UF step is regarded to be a MFR originating from step (a).

The starting material for the present process is animal skim milk, preferably bovine skim milk. Animal skim milk, i.e. non-human skim milk, preferably from bovine animals, and may be used as such, in diluted or concentrated form, as skim milk concentrate that optionally is diluted or as reconstituted skim milk powder.

The animal skim milk may be pretreated as known in the art, for example to reduce the bacterial content of the animal skim milk. Suitable methods include heat treatment (e.g. sterilization or pasteurization) or bacterial microfiltration. Such bacterial microfiltration, preferably over a membrane having a porosity of 1.0-2.0 micrometer, is employed to remove bacterial contamination of non-heat treated animal skim milk.

MF Step (a)

In the microfiltration step, animal skim milk is fractioned into two distinct streams, each enriched in a particular protein type; a casein enriched MF retentate (MFR) and a whey protein enriched MF permeate (MFP) are produced. This fractionation of protein types causes concomitant modifications to both streams in terms of macronutritional composition and mineral distribution.

The MF step (a) is performed over a membrane that enables fractionation of casein and whey proteins. Preferably such a membrane has a porosity of 0.10-0.35 micrometer. Preferably, a ceramic membrane or a spiral wound (organic) membrane is used. When a ceramic membrane is used, it is preferred that the porosity is 0.10-0.30 micrometer, and when a spiral wound organic membrane, it is preferred that the porosity is 0.10-0.35 micrometer, more preferably 0.15-0.35 micrometer. According to an especially preferred embodiment, a ceramic or spiral wound membrane is used with a porosity of 0.15-0.25 micrometer, most preferably a spiral wound membrane with a porosity of 0.15-0.25 micrometer is used. The MF step (a) preferably operates with a volume concentration factor (VCF) of 1.5-8, preferably 2-5, more preferably 2-4, most preferably 2.5-3.5. The MF step is preferably performed below 75° C., more preferably from 1° C.-60° C., even more preferably from 5° C.-25° C., most preferably from 7° C.-15° C. Performing the MF step (a) at a temperature below 25° C., or even below 15° C., is especially preferred, as at such temperatures, some β-casein was found to dissociate from the casein micelles, permeate through the MF membrane and end up in the whey protein enriched MFP. When this permeate is used, preferably after a further process step such as UF, for the manufacture of an infant formula base product, the fraction of β-casein in the casein component will be increased, which is more reminiscent to human milk. As such, the amino acid composition of the infant formula base product more closely resembles the amino acid profile of human milk. Moreover, at higher temperatures, e.g. above 25° C., the chance on bacterial contamination of the animal skim milk treated according to the invention increases, which is undesirable for the preparation of nutritional products for infants.

According to a preferred embodiment, microfiltration of step (a) is enhanced with diafiltration (DF). Diafiltration may be accomplished by diluting the retentate of the MF at least once with an amount of water, or by diluting the incoming animal skim milk with an amount of water and subjecting the diluted animal skim milk to MF. The amount of DF water used is preferably ranges from 50-500 wt % based on total weight of the incoming animal skim milk, more preferably ranges from 100-350 wt % of the incoming animal skim milk, most preferably ranges from 150-250 wt % of the incoming animal skim milk. The DF water may be added to the incoming animal skim milk or MFR at once, or the total amount of DF water may be added in several fractions. After each addition of DF water to the incoming animal skim milk or MFR, the diluted liquid composition is subjected to MF. The inventors surprisingly found that increasing the amount of DF water above 500 wt %, based on total weight of the incoming animal skim milk, negatively affects the composition of the MF retentate, as the total protein content of the MFR increased (the other solutes such as lactose and minerals are permeated to a greater extent), but the casein to whey protein ratio decreased, which indicates that more casein permeates through the MF membrane and/or MF membrane fouling with casein increases. As both are undesirable in the process according to the invention, it is preferred to keep the amount of DF water below 500 wt % of the incoming animal skim milk. MFR compositions were improved using less than 500 wt % DF water, further improved using less than 350 wt % DF water, and even further improved using less than 250 wt % DF water. In addition, using no or very little DF water, the whey protein content of the MFR generally increases to less preferred levels, which does not improve the fractionation between casein and whey proteins. As such, less whey proteins may permeate the MF membrane and the yield of whey proteins in the MFP decreases, which reduces the effectiveness of the process according to the invention. Thus, its is preferred to use more than 50 wt % DF water based on total weight of the incoming animal skim milk, more preferably more than 100 wt % of the incoming animal skim milk, most preferably more than 150 wt % of the incoming animal skim milk.

The above described parameters, such as porosity, temperature, VCF and amount of DF water, each individually but preferably in combination, enable optimisation of the formation of an MF permeate (MFP) and an MF retentate (MFR) which are ideally suited for the preparation of nutritional products for infants, such as infant formulae, follow-on formulae and growing up milks. The protein fraction of the MFR originating from step (a) comprises very little whey protein, preferably less than 15 wt %, more preferably less than 10 wt %, based on the weight of the protein fraction in MFR, and is high in casein. Preferably the protein fraction comprises at least 85 wt % casein, more preferably the protein fraction comprises at least 90 wt % casein. The content of total solids in the MFR typically ranges from 5-20 wt %, preferably ranges from 7-15 wt %, based on total weight of the MFR.

Some residual whey protein is always present in the MFR originating from step (a), first and foremost since not all the liquid comprising whey protein passes the MF membrane. Depending on the exact constitution of the animal skim milk and the nature of the pre-treatment, the amount of whey protein in the MFR originating from step (a) may vary. Preferably, the VCF is carefully chosen to obtain an MFR having a whey protein content below 15 wt % based on weight of the protein fraction.

Before being subjected to the combining step (c), the MFR originating from step (a) is preferably subjected to a concentration step (f), resulting in a concentrated MFR. Concentration of the MFR originating from step (a) may preferably be accomplished by RO, NF, UF and/or evaporation, more preferably by RO or UF, most preferably by RO. As such, the concentrated MFR, for example the RO retentate (ROR), the NF retentate (NFR) or the UF retentate (UF2R), is considered to be the MFR originating from step (a), which is subjected to combining in step (c). Concentration of the MFR originating from step (a) may be performed by any means known in the art, to obtain a concentrated MFR typically having a total solid content of 12-30 wt %, more preferably of 17-24 wt %. RO, NF or UF of the MFP originating from step (a) is preferably performed using a VCF of 1.5-8, more preferably of 1.7-3, and at a temperature of 40-90° C., more preferably 45-60° C. The inventors found that increasing the temperature as such greatly facilitates the fractionation, as the increasing solid content of the casein enriched MFR induces an increase in viscosity thereof. The viscosity may be reduced by increasing the temperature.

For concentration step (f), RO (step (f1)) of the MFR originating from step (a) is especially preferred, as the permeate thereof (ROP) essentially is solvent, in particular water, and nothing else. The RO of step (f1) is preferably performed using a VCF of 1.5-8, more preferably of 1.7-3, and at a temperature of 40-90° C., more preferably 45-60° C. As will be described further below, it is one of the preferred embodiments of the process according to the invention to recycle the water originating from concentration steps and use it as DF water in another filtration step of the present process, such as the MF step (a). The ROP is ideally suitable in this respect, as it basically is pure water, while an NFP may comprise significant amounts of monovalent ions. The composition of the ROR is equivalent to the composition of the MFR originating from step (a), only having a increased total solid content. Any RO as known in the art can be used. The RO step (f1) of the MFR originating from step (a) is especially preferred in case the process according to the invention is designed such as to obtain a secondary product, which is described further below, as all nutritional material of the MFR originating from step (a) is concentrated in the ROR originating from step (f1). At least part of this ROR is then used in the combining step (c). In one embodiment according to the invention, the remainder is considered to be a surplus stream.

In an alternative embodiment, UF (step (f2)) of the MFR originating from step (a) is preferred as concentration step (f), as the permeate thereof (UF2P) comprises minerals and lactose. The UF of step (f2) preferably employs a membrane having a molecular weight cut-off of at most 25 kDa, more preferably at most 10 kDa, and preferably of at least 2.5 kDa, more preferably at least 5 kDa, a VCF of 1.5-8, more preferably of 1.7-3, and is carried out at a temperature of 40-90° C., more preferably 45-60° C. The UF2P obtained from the MFR originating from step (a) is substantially the same as the UFP originating from step (b), and thus both UF2Ps are conveniently combined and further treated together, as described below for the UF2P originating from step (b). In one embodiment according to the invention, the UF2P is considered to be a surplus stream. The protein composition of the UF2R is equivalent to that of the MFR originating from step (a), and thus can be used as MFR originating from step (a). At least part of the UF2R may then be used in the combining step (c). In one embodiment according to the invention, the remainder is considered to be a surplus stream. The UF2R comprises mainly casein, typically at least 75 wt % casein, preferably at least 85 wt % casein, more preferably at least 90 wt % casein, most preferably the UF2R comprises at least 95 wt % casein, based on total dry weight of the UF2R. The remainder of the UF2R may include components such as whey proteins, lactose, minerals and the like. Thus, the part of the UF2R that is not used in the combining step (c) is a valuable product, and may also be referred to as micellar casein.

As preferably only part of the MFR originating from step (a) is used in the combining step (c), in the context of the present invention the remainder of the MFR is considered a surplus stream. Likewise, in case those are formed, the NFP and/or UFP are also considered surplus streams. In one especially preferred embodiment, the process according to the invention is a closed-loop process, wherein all fractions obtained during the various filtration steps are used in final products. As such, all surplus streams are combined in a secondary product, as is discussed further below. For this embodiment, concentration step (f) is preferably RO step (f1).

The MFP originating from step (a) typically has a total solid content of 0.5-5 wt %, preferably 1-3 wt % based on total weight of the MFP. It is highly preferred to subject the MFP originating from step (a) to a concentration step (g) before subjecting it to the UF of step (b). Concentration of the MFP originating from step (a) preferably is accomplished by RO, NF and/or evaporation, most preferably by RO. As such, the concentrated MFP, for example the RO retentate (RO2R) or the NF retentate (NFR), is considered to be the MFP originating from step (a), which is subjected to UF in step (b). Concentration of the MFP originating from step (a) may be performed by any means known in the art, to obtain a concentrated MFP typically having a total solid content of 4-10 wt %, more preferably 6-9 wt %. RO or NF of the MFP originating from step (a) is preferably performed using a VCF of 1-8, more preferably 2-5. RO of the MFP originating from step (a) is especially preferred as concentration step (g), as the permeate thereof (RO2P) essentially is made up solvent, in particular water, and nothing else. As will be described further below, it is one of the preferred embodiments of the process according to the invention to recycle the water originating from concentration steps and use it as DF water in another filtration step of the present process, such as the MF step (a). The ROP is ideally suitable in this respect, as it basically is pure water, while the NFP may comprise significant amounts of monovalent ions. The composition of the RO2R is equivalent to the composition of the MFP originating from step (a), only having an increased total solids content. Any RO as known in the art can be used.

Thus, it has been found that keeping the porosity and VCF of the MF step (a), and preferably the temperature and amount of DF water, within the specified ranges, yields both an optimally constituted casein enriched MFR and an optimally constituted whey protein enriched MFP, which facilitates the manufacture of an infant formula base product with minimal process steps.

UF Step (b)

According to the invention, an MFP originating from step (a) is subjected to an ultrafiltration (UF) step (b), wherein most of the liquid and small solutes end up in the UF permeate (UFP), while the UF retentate (UFR) comprises substantially all whey protein, in a smaller volume. Small molecules which permeate through the UF membrane are for example lactose, monovalent and polyvalent ions.

The incoming stream of the UF step is a liquid composition originating from the MFP. The ultrafiltration of step (b) can be carried out with any UF membrane known in the art, including ceramic membranes, tubular and organic spiral wound membranes. Preferably the UF membrane is an organic spiral wound membrane. The UF membrane has a molecular weight cut-off of that enables proteins, preferably whey proteins, to remain in the retentate, and allow small solutes, for example lactose, to permeate through the membrane. The UF step (b) preferably is carried out with a membrane having a molecular weight cut-off of at most 25 kDa, more preferably at most 10 kDa, and preferably of at least 2.5 kDa, more preferably at least 5 kDa. The UF step (b) preferably operates with a volume concentration factor of 1.5-8, preferably 3-7, more preferably 3-6. The UF step (b) is preferably performed below 40° C., more preferably in the range of 5° C.-25° C., even more preferably in the range of 7° C.-15° C.

The above described parameters, such as MWCO, temperature and VCF, each individually but preferably in combination, enable optimisation of the formation of a UF permeate (UFP) and an UF retentate (UFR) originating from the UF step (b), which are ideally suited for the preparation of (base products of) nutritional products for infants, such as infant formulae, follow-on formulae and growing up milks. The UFR originating from UF step (b) typically comprises 25-50 wt %, preferably 30-40 wt % whey proteins based on total dry weight of UFR. The UFR is thus enriched in whey proteins. The lactose and mineral (monovalent and polyvalent ions) content of the UFR is reduced when compared to the incoming MFP originating from step (a), as those components permeate through the UF membrane. However, the inventors surprisingly found that using a VCF below 8, preferably below 7, more preferably below 6, retained significant amounts of lactose and minerals in the whey protein enriched UFR to enable efficient preparation of infant formula base products thereof, without exceeding the maximum levels of those components (especially minerals) in the final products. Using greater VCFs for the UF of step (b) reduces the lactose and mineral content of the UFR to values below those desired for infant formulae and the like, such that significant supplementation would be needed. Moreover, the lactose-enriched UFP which is obtained when using higher VCF values is high in mineral content, which needs to be lowered before this lactose is suitable for the preparation of infant formula base products. Performing the UF of step (b) with smaller VCFs, such as below 1.5 or below 3, does not remove sufficient minerals from the MFR originating from step (a), such that the content of certain minerals in the final infant formula base product would be too high, especially the content of polyvalent ions would be too high. In case the monovalent ion content in the UFR would be too high for infant formulae base product manufacture, this content could be lowered by NF as discussed below.

The UFR of step (b) typically has a total solid content of 5-20 wt %, preferably of 10-15 wt %. It is highly preferred to subject the UFR to a concentration step (e) before subjecting it to the combining step (c), which makes the process more cost-effective, for example by reducing costs for evaporation and mixing in the final steps. The concentration step (e) preferably is RO, NF and/or evaporation, most preferably NF. As such, the concentrated UFR, for example the RO retentate (ROR) or the NF retentate (NF2R), is considered to be the UFR originating from the UF of step (b), which is subjected to combining in step (c). Concentration of the UFR may be performed by any means known in the art, to obtain a concentrated UFR typically having a total solid content of 15-35 wt %, more preferably of 20-30 wt %. In case the concentration step (e) is RO or NF, preferably a VCF of 1-6, more preferably of 1.5-3 is used. NF of the UFR is especially preferred as concentration step (e), as the permeate thereof (NF2P) is reduced in monovalent ions, which are able to permeate the NF membrane. As such, the monovalent ion content of the UFR originating from step (b) will be reduced, enabling efficient infant formula base product manufacture. Such further reduction of the monovalent ion content of the UFR originating from step (b) may be necessary, depending on the nature and exact constitution of the incoming skim milk. Thus, the UFR originating from step (b) may still be too high in for example sodium and potassium ion content, and thus the composition of the final product may benefit from concentration of the UFR originating from step (b) by NF as step (e). As the NF permeate (NF2P) originating from step (e) typically is a solution of monovalent ions in water, it is not directly suitable as DF water. Therefore it is preferred to remove monovalent ions from the NF2P by RO, as such concentrating the monovalent ions in an RO3R and obtaining substantially pure water as RO3P. Preferably, NF as step (e) employs a spiral wound membrane having a molecular weight cut-off of at most 500 Da, preferably at most 300 Da, and of at least 100 Da, preferably at least 150 Da, and typically operates with a volume concentration factor of 1.5-8, preferably 1.8-5. NF is preferably performed below 40° C., more preferably from 3° C.-30° C., even more preferably from 5° C.-20° C. Using NF, the UFR originating from step (b) is further concentrated in whey protein and is reduced in monovalent ion content. The remaining part of the NF2P, and optionally the RO3R, as obtained in the preferred process of concentration step (e) of the UFR originating from step (b) are considered surplus streams according to the present invention.

The UFP is enriched in lactose and minerals, and typically has a total solid content of 3-10 wt %, preferably of 5-7 wt %. The lactose present in the UFP is beneficially used to supplement the final infant formula base product, preferably by combining an UFP originating from step (b), preferably a demineralized UFP, with both the MFR originating from step (a) and the UFR originating from step (b), as part of the combining step (c). As not all of the lactose present in the UFP originating from step (b) may be needed for the preparation of an infant formula base product having the desired lactose content, in one embodiment it is beneficial to split the UFP in a first part that is processed to enable efficient infant formula base product preparation, and in a second part that is processed differently for other nutritional products, preferably for growing-up milks, as will be described further below. As mentioned before, the UF2P of the preferred option (f2) for concentration step (f) of the MFR originating from step (a), may be combined with the UFP originating from step (b). This combining is either performed before the UFP originating from step (b) is split in a first part and a second part, or after the UFP originating from step (b) is split. Preferably, when the combining is performed after the split of the UFP originating from step (b), this combining occurs with the second part of the UFP originating from step (b).

Thus, according to a preferred embodiment, at least part of the UFP originating from step (b) is processed to enable efficient infant formula base product preparation. Such processing typically includes lowering of the mineral content in a demineralization step (d), i.e. lowering of the monovalent ion content and lowering of the polyvalent ion content. Such demineralization may take the form of a single step in which significant amounts of both monovalent and polyvalent ions are removed, for example by electrodialysis, or a two-step process in which significant amounts of monovalent and polyvalent ions are removed in two separate steps, for example by ion exchange or salt precipitation for polyvalent ion removal and NF for monovalent ion removal. The demineralization of step (d) retains all lactose in the UFP originating from step (b), thus in case demineralization of the UFP is part of the process according to the invention, the demineralized UFP is considered the UFP originating from step (b). Thus, the process according to the invention preferably comprises a step (d), wherein at least part of the UFP originating from step (b) is demineralized, resulting in a demineralized UFP and wherein the demineralized UFP originating from step (d) is subjected to the combining step (c).

Polyvalent ion removal enables the removal of significant amounts of polyvalent ions. Preferably at least 20 wt %, or preferably 50 wt %, more preferably at least 70 wt % or at least 80 wt %, most preferably at least 90 wt % of the polyvalent ions present in the incoming UFP originating from step (b) are removed. Thus, the UFP after polyvalent ion removal preferably comprises at least 50 wt % less polyvalent ions, preferably at least 70 wt % less, more preferably at least 80 wt % less, most preferably at least 90 wt % less polyvalent ions, when compared to the incoming UFP originating from step (b). Monovalent ion removal causes the removal of significant amounts of monovalent ions. Preferably, at least 20 wt % of the monovalent ions are removed, more preferably at least 35 wt % or at least 50 wt %, most preferably at least 60 wt % of the monovalent ions are removed. Thus, the demineralized UFP preferably comprises at least 50 wt % less ions, preferably at least 70 wt % less, more preferably at least 80 wt % less, most preferably at least 90 wt % less ions, when compared to the incoming UF permeate originating from step (b). Removal of polyvalent ions and monovalent ions from the UFP originating from step (b) is especially preferred in the process according to the invention for the preparation of an infant formula base product.

Polyvalent ion removal and monovalent ion removal, which can also be referred to as demineralization step (d) may be accomplished using any technique known in the art, such as electrodialysis, ion exchange, salt precipitation, lactose crystallization, membrane filtration techniques such as nanofiltration, optionally enhanced with diafiltration, or combinations thereof. In the context of the present invention, demineralization also includes the crystallization of lactose from the UFP originating from step (b) and simultaneously keeping significant amounts of the polyvalent ions and monovalent ions in solution. The obtained crystalline lactose is regarded to be a demineralized UFP in the context of the present invention, as it originates from the UF of step (b) and has significant amounts of the polyvalent ions removed. Preferably, the demineralization step (d) of the UFP originating from step (b) includes salt precipitation, in particular calcium phosphate precipitation, as especially the phosphate content of the incoming animal skim milk is too high for infant formula base products. The preferred monovalent ion removal technique is NF. Thus, according to an especially preferred embodiment of the process according to the invention, at least part of the UFP originating from step (b) is demineralized in step (d) by a combination of salt precipitation and NF. In an alternative preferred embodiment for the demineralization step (d), the monovalent and polyvalent ion content is lowered simultaneously by filtration over a membrane having a MWCO of 500-1000 Da, preferably of 500-700 Da, whereby the VCF is typically chosen such that the total solid content of the retentate is in the range of 15-30 wt %, preferably in the range of 20-25 wt %, most preferably about 22 wt %. Such filtration employs slightly larger pores than common NF, which typically has a porosity of at most 300 Da. Such larger pores enable the permeation of significant amounts of both monovalent and polyvalent ions, which is not achievable with common NF, and may be accompanied with some lactose permeation. As the total lactose content of the UFP originating from step (b) is generally higher than the desired amount of lactose that is to be combined in the preferred embodiment of step (c), the loss of some lactose in the permeate does not hamper the efficiency of the process according to the invention.

In one particularly preferred embodiment, the demineralization step (d) comprises:

(d1) nanofiltration (NF) of at least part of the UFP originating from step (b), resulting in a retentate (NF3R) and a permeate (NF3P);
(d2) subjecting the NF3R originating from step (d1) to calcium phosphate salt precipitation;
(d3) removing the precipitated salts, resulting in the demineralized UFP.

According to this preferred embodiment for demineralization step (d), at least part of the UFP is first subjected to NF in step (d1) to remove significant amounts of monovalent ions and to concentrate the lactose and polyvalent ions in the NFR. It is preferred that the NF3P is subsequently subjected to RO, to be able to use the resulting RO4P as DF water in another filtration step in the process of the invention, in particular in the MF of step (a). The NF3R typically has a total solid content of 15-30 wt %, preferably of 20-25 wt %, most preferably about 22 wt %. Preferably, NF of step (d1) employs a spiral wound membrane having a molecular weight cut-off of at most 500 Da, preferably at most 300 Da, and of at least 100 Da, preferably at least 150 Da, whereby the VCF is typically chosen such that the total solid content of the NF3R is in the range of 15-30 wt %, preferably in the range of 20-25 wt %, most preferably about 22 wt %. NF of step (d1) is preferably performed below 40° C., more preferably in the range of 3° C.-30° C., even more preferably in the range of 5° C.-20° C.

The NF3R is subsequently subjected to calcium phosphate salt precipitation in step (d2), which is preferably accomplished by heating the NF3R to a temperature of 70° C.-90° C., preferably of 75° C.-88° C., most preferably of 80° C.-85° C. At such temperatures, at least part of the calcium phosphate precipitates, which is visible as a white precipitate. Higher temperatures are generally unsuitable, as they may cause undesirable enzymatic browning. Heating may occur by any means known in the art, and is preferably accomplished by steam injection into the NF3R. Calcium phosphate precipitation may be enhanced, meaning that a greater fraction of the calcium phosphate precipitates, by increasing the pH of the heated NF3R to a value above 6.5, preferably in the range of 6.8-9.0, more preferably in the range of 6.8-7.4, and/or by adding other calcium salts such as calcium chloride. The NF3R typically has a pH of 6.0-6.5, and increasing this to above 6.5, preferably in the range of 6.8-9.0, more preferably in the range of 6.8-7.4, can be accomplished by addition of a base, preferably an aqueous solution of a metal hydroxide, such as sodium hydroxide, potassium hydroxide and/or calcium hydroxide. Preferably, a concentrated solution sodium hydroxide is used, more preferably a 20-35% (w/v) solution of NaOH in water. Only little of the base solution is needed, as the components that may act as buffer are removed by NF. As guidance, typically about 0.1-1 wt % based on the total weight of the NF3R, preferably 0.3-0.5 wt % based on the total weight of the NF3R, of a solution of about 30% (w/v) NaOH in water is used. The skilled person is capable to adjust this value for changes in pH of the NF3R, different types of base and different concentrations. As the calcium content should not necessarily be reduced as much as the phosphate content of the UFP originating from step (b), in order to prepare infant formula base products with both calcium and phosphate on or below desired values, some additional calcium, preferably in the form of calcium chloride, calcium citrate, calcium lactate, calcium hydroxide, or mixtures thereof, preferably calcium chloride, can be added to the heated NF3R, which induces the precipitation of more calcium phosphate. Using calcium hydroxide preferably achieves both the pH increase and addition of a calcium salt, but its suitability is slightly hampered by its low solubility. Thus, in a preferred embodiment, a mixture of calcium chloride and sodium hydroxide is added to the NF3R to enhance calcium phosphate precipitation. As such, the demineralized UFP will have a phosphate content which is further reduced compared to the calcium content.

In step (d3), the precipitate, or more precisely precipitated salts, is removed from the NF3R originating from step (d2), resulting in a demineralized UFP. This is preferably accomplished by first cooling the heated NF3R to a temperature below 25° C., more preferably in the range of 5° C.-20° C., most preferably in the range of 8° C.-15° C., before the precipitate is removed from the NF3R. Rapidly cooling the NF3R is especially preferred, to reduce the chances on undesirable bacterial growth and to minimize the resolubilization of calcium phosphate. Although less preferred, the precipitate may also be removed from the NF3R at an elevated temperature, for example at a temperature above 25° C. Removal of the precipitate in step (d3) is conveniently performed by centrifugal separation, decantation in a settling tank, filtration, for example MF or UF. Preferably, removal step (d3) is performed by filtration, more preferably by UF, which permeates the lactose and soluble minerals and retains the precipitate which predominantly comprises calcium phosphate. Any UF membrane as known in the art may be used, although using an UF bed is preferred. The VCF of the UF of step (d3) is typically in the range of 5-20, preferably in the range of 10-15. Thus, in case step (d3) is performed by UF, the UF permeate (UF3P) comprises substantially all lactose as originally present in the incoming UFP originating from step (b), which is subjected to the demineralization step (d). The UF3P is thus preferably used as the demineralized UFP, in particular as the UPF originating from step (b), in combining step (c). Using this preferred process of demineralization step (d), reduction of the phosphate content of up to 80 wt %, even up to 90 wt %, can be achieved, based on the phosphate content of the UFP obtained in step (b).

As said, it is preferred to subject only that part of the UFP to demineralization that is needed for the preparation of the infant formula base product. The amount of the UFP needed in that respect may depend on the exact lactose content of the incoming skim milk and the lactose content of each of the MFR originating from step (a) and the UFR originating from step (b), as well as the desired lactose content of the final infant formula base product. The skilled person is well aware of the lactose requirements in infant formula base products, and knows how to determine the lactose content in the different liquid compositions, and it is therefore within his or her reach to determine which part of the UFP originating from step (b) is to be subjected to demineralization. The remaining part of the UFP originating from step (b), as well as the NF3P and/or the RO4R as obtained in the preferred process of demineralization, are considered surplus streams according to the present invention. In one especially preferred embodiment, the process according to the invention is a closed-loop process, wherein all fractions obtained during the various filtration steps are used in final products. As such, all surplus streams preferably are combined in a secondary product, as is discussed further below.

Combining Step (c)

An UFR originating from step (b), an MFR originating from step (a) and preferably an UFP originating from step (b), more preferably a demineralized UFP originating from step (d), are ideally suited to be combined to produce an infant formula base product with the desired protein and lactose content and the desired casein/whey protein weight ratio. In this respect, it is to be understood that whenever the UFR originating from step (b), the MFR originating from step (a) and/or the UFP originating from step (b) undergoes additional processing steps prior to the combining of step (c), such as a concentration step, they are still considered to be the UFR originating from step (b), the MFR originating from step (a) and/or the UFP originating from step (b), respectively, in the context of the present invention. The amounts of the UFR originating from step (b) and the MFR originating from step (a), which are subjected to step the combining of step (c), are selected as such, to arrive at a final product having a casein/whey protein weight ratio in the range of 30/70-50/50, preferably in the range of 35/65-45/55, most preferably in a ratio of about 40/60. This typically means that all of the UFR originating from step (b) is combined with part of the MFR originating from step (a), and the remainder of the MFR originating from step (a) is thus considered a surplus stream in the context of the present invention. The amount of the UFP originating from step (b), more preferably of the demineralized UFP originating from step (d), is selected such to arrive at a lactose content in the final product that is desired, or in other words on target, for infant formula base products, thereby taking into account further traces of lactose that may be added during further supplementation, for example from prebiotic supplementation. As said before, it is preferred that only that part of the UFP originating from step (b) is subjected to the demineralization step (d) that is needed in the combining step (c) to arrive at a lactose content that is on target for infant formula base products, and the remaining of the UFP originating from step (b) is regarded a surplus stream in the context of the invention.

Combining can be performed as wet mixing or as dry mixing or even a combination of both. Preferably, the combining occurs as wet mixing, wherein liquid compositions are mixed in the appropriate amounts. These liquid compositions may undergo further additional processing steps prior to mixing. Such additional processing steps may include, preferably are limited to, concentrating the liquid stream, preferably increasing the total solids content, for example via evaporation or partial evaporation or filtration techniques such as nanofiltration or reverse osmosis, heat-treatment, such as for example pasteurization, such as HTST, ESL or UHT or sterilization, for example dry heat or moist heat sterilization and/or supplementation of additional water or other components. Preferably, after combining, the liquid composition is dried to a powder. Alternatively, combining step (c) is performed as dry mixing, wherein each liquid composition individually is dried prior to mixing. Less preferred for economic reasons, but also encompassed in the present invention, is to dry one or more, but not all, of the liquid compositions that are to be combined prior to step (c), and combining step (c) occurs by mixing at least one liquid composition and at least one dry, or dried composition. Drying of a liquid composition, either after or prior to mixing, may be accomplished by any means known in the art, e.g. spray drying, (fluidized) bed drying, drum drying, freeze drying, roller drying, etc. In an especially preferred embodiment, drying is accomplished using spray drying, optionally preceded by partial evaporation of the liquid.

In an especially preferred embodiment of the present invention, the mixing is performed using liquid compositions in the appropriate amounts, thus preferably by wet mixing, after which the mixture is dried, preferably spray-dried. As such, only one drying step is needed in the manufacture of an infant formula base powder. Conventional processes for preparing infant formula base products contain more drying steps, such as drying of a casein containing composition, drying of a whey protein containing composition, drying of lactose, in particular crystallized lactose. Drying, such as spray-drying, is a costly procedure, which is typically performed at high temperatures, such as above 150° C. or even above 180° C. Reducing the amount of (spray-)drying steps to just one greatly improves the efficiency of the process. Thus, it is preferred that the process according to the invention does not comprise a (spray-)drying step prior to combining step (c). Again, additional process steps such as partial evaporation may be performed prior to combining or in between combining and (spray-)drying, according to this preferred embodiment of the invention. Such optional further processing steps include, preferably are limited to, concentrating the liquid stream (i.e. increasing the total solid content, e.g. via (partial) evaporation), heat-treatment, for example pasteurization, such as HTST, ESL or UHT, or sterilization, for example dry heat or moist heat sterilization and/or supplementation of additional water or other components.

The process according to the invention yields an infant formula base product, preferably in the form of a powder. As well-known in the art, an infant formula base product comprises all proteinaceous material in the desired content for the manufacture of infant formulae and the like. Preferably, other components such as minerals, vitamins, lactose, prebiotics are also present in their desired contents, more preferably at least the minerals are present in the desired contents. Herein, the desired content is determined with respect to the protein content in the infant formula base product, as the total dry matter of the infant formula is likely to change, for example by fat addition.

It is highly advantageous that upon combining in step (c), the content of the essential components other than casein and whey protein are on or below target. When the content of a specific component is below target, it is possible to supplement this component to the final product, however when its content is above target, removal thereof can be problematic. Thus, it is an aim of the process according to the invention that the content of each of lactose, fat, ash, phosphorus, calcium, magnesium, sodium, potassium and chloride are on or below target. Preferably, the need for supplementing additional minerals is reduced with respect to known processes. Thus, it is preferred that the content of at least one of phosphorus, calcium, magnesium, sodium, potassium and chloride is on target, more preferably the content of at least two of phosphorus, calcium, magnesium, sodium, potassium and chloride are on target, even more preferably the content of at least three of phosphorus, calcium, magnesium, sodium, potassium and chloride are on target, even more preferably the content of at least four of phosphorus, calcium, magnesium, sodium, potassium and chloride are on target, most preferably the content of at least five of phosphorus, calcium, magnesium, sodium, potassium and chloride are on target. If the content of one or more minerals is below target, fortification with that particular mineral may be needed. Thus, in a preferred embodiment, the final product is supplemented with any ingredient which is below target.

Thus, the amounts of ions, such as phosphorus, sodium, potassium, chlorine and magnesium are advantageously within the desired range, when the UFR originating from step (b) is combined with the MFR originating from step (a) in the appropriate ratio to obtain a composition having the required casein/whey protein weight ratio.

In a preferred embodiment of the process according to the invention, the infant formula base product originating from step (c) is further processed into an infant formula, a follow-on formula or a growing-up milk, preferably into an infant formula, by methods known in the art. As a result of the process according to the invention, the fat content may be below target for an infant formula, as the process operates most efficiently when the fat content of the incoming animal skim milk is minimal. Thus, for the further processing into an infant formula, a follow-on formula or a growing-up milk, the final product may be supplemented with fat, which enables the supplementation of a specifically designed fat component, which is ideally suitable for infant nutrition. Beneficially, supplementation is performed with prebiotics, vitamins, probiotics, etc, as known in the art. The skilled person is well aware of the essential and beneficial ingredients for infant nutrition, and how they are best blended with the base product. Further processing of the infant formula base product preferably comprises one or more of, more preferably all of, concentrating, wet and/or dry blending of one of the above mentioned ingredients, preferably of minerals, vitamins and fat, homogenizing, heat-treating, drying. Supplementation and/or fortification of particular ingredients can be either prior to, during or after combining step (c) and/or optionally prior to or after a drying step.

The process preferably operates with 1-2000 tonne animal skim milk, more preferably 10-200 tonne, most preferably 50-100 tonne animal skim milk incoming per hour. The process preferably operates with an output of 0.1-1000 tonne, more preferably 0.5-100 tonne, most preferably 2-40 tonne UFR obtained directly from step (b) per hour.

The process according to the invention provides sufficient removal of polyvalent ions and preferably monovalent ions, by virtue of the microfiltration step (a) and the ultrafiltration step (b), preferably combined with demineralization of the UFP originating therefrom, so that all minerals are at or below their desired or required level for infant nutrition. In case the content of a certain mineral is below the desired level, preferably that mineral is added to be on target, as for example according to EU directive 91/321/EEC or EU directive 2006/141/EC or US Food and Drug Administration 21 CFR Ch 1 part 107.

The process according to the invention may afford residual water at several points, in particular as ROP obtained in for example the concentration of any of the MFR and MFP originating from step (a) and the UFR and UFP originating from step (b), but optionally also from the drying step. In a preferred embodiment, this residual water, optionally after further purification by e.g. additional RO step(s), is recycled in the process according to the invention, preferably as diafiltration water to dilute or reconstitute the incoming animal skim milk.

Manufacture of a Secondary Product

According to an especially preferred embodiment, the process according to the invention is a closed-loop process, wherein all surplus streams are combined and processed into a secondary product. As such, the process according to the present invention may afford two distinct products, one of which is the infant formula base product. The secondary product is preferably a nutritional product suitable for feeding infants from 6-36 months of age, preferably for feeding infants from 12-36 months of age, or an ingredient for a nutritional product suitable for feeding infants from 6-36 months of age, preferably for feeding infants from 12-36 months of age, most preferably the secondary product is a growing-up milk. Surplus streams obtained by the present process include part of the MFR originating from step (a) and part of the UFP originating from step (b), and may include NFPs or RORs obtained in concentration steps. Those surplus streams are preferably combined and used for the manufacture of the secondary product.

Typically, all whey proteins end up in the infant formula base product via the UFR originating from step (b). Thus, the major proteinaceous material of the secondary product is casein from the MFR originating from step (a). Casein from the MFR originating from step (a) is a nutritionally acceptable protein source for infants from 6-36 months of age. The major carbohydrate source of the secondary product is lactose from the UFP originating from step (b). Any NFP or ROR originating from the process according to the invention is typically rich in beneficial minerals for infants from 6-36 months of age. Preferably, the surplus streams as defined in the process of the invention are combined into a casein-rich composition, which typically comprises 50-60 wt % protein, based on dry weight of the composition of which casein preferably constitutes at least 80 wt %, for example 85-95 wt %, based on total protein and the carbohydrate content is typically at least 30 wt %, for example 30-40 wt %, based on dry weight of the composition while ash, as a measure for the mineral content, preferably constitute from 7-14 wt % based on dry weight of the composition.

The combined surplus streams thus represents a valuable starting point for manufacturing secondary nutritional products according to the invention and thus in one aspect the present invention concerns a casein rich composition comprising i) 40-50 g casein per 100 g dry weight, preferably 43-48 g casein per 100 g dry weight,
ii) 30-40 g lactose per 100 g dry weight, preferably 33-38 g lactose per 100 g dry weight
iii) 5-16 g ash per 100 g dry weight, preferably 7-14 g ash per 100 g dry weight.

Preferably the casein rich composition further comprises iv) 0-10 g whey per 100 g dry weight, preferably 2-8 g whey per 100 g dry weight,
v) 0.1-2 g fat per 100 g dry weight, preferably 0.5-1.5 g fat per 100 g dry weight, vi) 0.1-5 g non-protein-nitrogen (NPN) per 100 g dry weight, preferably 1-4 g NPN per 100 g dry weight.

In a preferred embodiment, the casein rich composition comprises 1-9 mg sodium per g dry weight, preferably 3-7 mg sodium per g dry weight,
15-30 mg potassium per g dry weight, preferably 20-25 mg potassium per g dry weight,
4-14 mg chlorine per g dry weight, preferably 6-11 mg chlorine per g dry weight,
14-24 mg calcium per g dry weight, preferably 15-21 mg calcium per g dry weight,
0.5-2.5 mg magnesium per g dry weight, preferably 1-2 mg magnesium per g dry weight,
9-19 mg phosphorus per g dry weight, preferably 11-17 mg phosphorus per g dry weight.

This casein-rich composition is ideally suited as ingredient for nutritional products for infants from 6-36 months of age, preferably for infants from 12-36 months of age, such as growing-up milks. Additional ingredients are preferably added to the combined surplus streams to prepare the secondary product, such as whey protein, further lactose or other carbohydrates, fat, vitamins, minerals, prebiotics, probiotics and other beneficial ingredients for infants from 6-36 months of age, preferably for infants from 12-36 months of age as known in the art. Supplementation with minerals may not be required, or may not be required to a great extent, as the surplus streams contain significant amounts of minerals, especially in case one or more UFP and/or ROR is obtained as surplus stream.

The protein fraction of the secondary product comprises preferably at least 50 wt % casein, more preferably at least 55 wt % casein, even more preferably at least 60 wt % casein, even more preferably at least 65 wt % casein most preferably at least 70 wt % casein, based on total weight of protein in the secondary product, wherein the source of casein is MFR originating form step (a) of the process acoording to the invention. In one embodiment, the protein fraction of the secondary product comprises preferably at least 80 wt % casein, more preferably at least 85 wt % casein, more preferably at least 90 wt % casein, even more preferably at least 95 wt % casein, most preferably at least 99 wt % casein, based on total weight of protein in the secondary product, wherein the source of casein is MFR originating form step (a) of the process according to the invention. Thus preferably as little as possible of a protein source different from MFR originating from step (a) is added or even no protein from a different source than MFR originating from step (a) is added. Preferably the protein from a different source compsises whey protein. Preferably protein from a different source is added in such an amount to arrive at a casein/whey protein weight ratio of 50/50-100/0.

Thus, according to a preferred embodiment, the process according to the invention includes using part of the MFR originating from step (a) as protein source in the manufacture of a secondary nutritional product, wherein the secondary nutritional product comprises at most 50 wt % of protein from a different source, preferably at most 45 wt %, preferably at most 40 wt %, more preferably at most 35 wt % of protein from a different source. Also, according to a preferred embodiment, the process according to the invention includes using part of the MFR originating from step (a) as protein source in the manufacture of a secondary nutritional product, wherein the secondary nutritional product comprises at most 20 wt %, preferably at most 10 wt % of protein from a different source. Preferably the secondary nutritional product is suitable for feeding infants form 6-36 months of age, perferably for feeding infants form 12-36 months of age, preferably for feeding toddlers, more preferably the secondary nutritional product is a growing-up milk. Preferably the MFR originating from step (a) that is used in this embodiment, is MFR that is a surplus stream of MF step (a), or in other words the MFR originating from step (a) that is used in this embodiment, is MFR that is not used in step (c).

In one embodiment the manufacture of a secondary nutritional product comprises a combining step (h), wherein a part of the MFR originating from step (a), preferably a surplus stream of microfiltration step (a), is combined with a part of the UFP originating from step (b). Preferably the UFP originating from step (b) that is used in this embodiment, is UFP that is a surplus stream of UF step (b), or in other words the UFP originating from step (b) that is used in this embodiment, is the second part of the UFP originating from step (b), which is not used in step (d).

It is especially preferred that the combining step (h) further comprises combining with an NFP or an ROR, as obtained in any of optional steps (d1), (e), (f1) and (g). Preferably, all NFPs or RORs, as obtained in optional steps (d1), (e), (f1) and (g) are combined in step (h), for the manufacture of the secondary nutritional product.

In one embodiment according to the invention, the combined surplus streams, prior to the addition of any further ingredient which is not directly obtained from the incoming skim milk, are subjected to a drying step, which may be accomplished by any means known in the art, e.g. spray drying, bed drying, fluidized-bed drying, drum drying, freeze drying, roller drying, etc. In an especially preferred embodiment, drying is accomplished by spray drying, optionally preceded by partial evaporation of the liquid.

The present invention also relates to a nutritional product suitable for feeding infants form 6-36 months of age, preferably toddlers, preferably a growing-up milk, wherein the nutritional product comprises at most 10 wt % of protein from a different source than the protein comprised in the MFR originating from step (a). Preferably as little as possible of a protein source different from MFR originating from step (a) is added or even no protein from a different source than MFR originating from step (a) is added. Preferably the protein from a different source compsises whey protein. Preferably protein from a different source is added in such an amount to arrive at a casein/whey protein weight ratio of 90/10-100/0.

A further aspect of the present invention is a process for the manufacture of a nutritional product suitable for feeding infants from 6-36 months of age, comprising:
  (i) microfiltration (MF) of animal skim milk over a membrane having a porosity of 0.10-0.35 micrometer and operating with a volume concentration factor of 1.5-8, resulting in a retentate (MFR) and a permeate (MFP);
  (ii) optionally reverse osmosis (RO) of an MFR originating from step (i), resulting in a retentate (RO2R) and a permeate (RO2P);
  (iii) combining at least part of an MFR originating from step (i) or an RO2R originating from (ii) as protein source with one or more additional ingredients,
wherein the nutritional product comprises less than 50 wt % of protein from a different source than the protein comprised in the MFR originating from step (i). Step (i) is preferably performed identically to step (a). Step (ii) is preferably performed identically to step (f1). Step (iii) can be performed as wet mixing or as dry mixing or even a combination of both. In one embodiment, the nutritional product of combining step (iii) comprises less than 45 wt %, more preferably less than 40 wt %, even more preferably less than 35 wt % or even less than 30 wt % of protein from a different source than the protein comprised in the MFR originating from step (i). In one embodiment, the nutritional product of combining step (iii) comprises less than 20 wt %, more preferably less than 15 wt %, even more preferably less than 10 wt %, of protein from a different source than the protein comprised in the MFR originating from step (i). The protein from a different source preferably comprises whey protein. Preferably, the combining occurs as wet mixing, wherein liquid compositions are mixed in the appropriate amounts. These liquid compositions may undergo further additional processing steps prior to mixing. Such additional processing steps may include, preferably are limited to, concentrating the liquid stream, preferably increasing the total solid content, for example via evaporation or partial evaporation or filtration techniques such as nanofiltration or reverse osmosis, heat-treatment, such as for example pasteurization, such as HTST, ESL or UHT or sterilization, for example dry heat or moist heat sterilization and/or supplementation of additional water or other components. The one or more additional ingredients that are subjected to the combining step (iii) are preferably chosen from whey protein, lactose, sucrose or other carbohydrates, fat, vitamins, minerals, an UFP originating from step (iv), prebiotics, probiotics and other beneficial ingredients for infants from 6-36 months of age as known in the art.

According to a preferred embodiment, the process according to the present aspect of the invention further comprises:
  (iv) ultrafiltration (UF) of an MFP originating from step (i) over a membrane having a molecular weight cut-off of at most 25 kDa and operating with a volume concentration factor of 1.5-8, resulting in a retentate (UFR) and a permeate (UFP),
wherein step (iii) comprises combining with at least part of an UFP originating from step (iv). Step (iv) is preferably performed identically to step (b). Preferably, the combining step (iii) further comprises combining with one or more surplus streams obtained from the process of the preparation of an infant formula base product from animal skim milk, such as NFPs or RORs or both. Preferably, the combined MFR originating from step (i) or RO2R originating from (ii) and UFP originating from step (iv), and any other surplus stream obtained by the process according to the invention, prior to the addition of any additional ingredient that is not directly obtained from the incoming skim milk, are subjected to a drying step, which may be accomplished by any means known in the art, e.g. spray drying, bed drying, fluidized bed drying, drum drying, freeze drying, roller drying, etc. In an especially preferred embodiment, drying is accomplished by spray drying, optionally preceded by partial evaporation of the liquid.

The process according to the present aspect of the invention is for the preparation of a nutritional product suitable for feeding infants from 6-36 months of age, preferably toddlers, preferably for the preparation of a growing-up milk, wherein the nutritional product comprises less than 50 wt % of protein from a different source than from an MFR of animal skim milk, preferably less than 45 wt %, more preferably less than 40 wt %, even more preferably less than 35 wt % even more preferably less than 30 wt % of protein from a different source than from an MFR of animal skim milk or in one embodiment, the nutritional product comprises less than 20 wt %, more preferably less than 15 wt %, even more preferably less than 10 wt %, of protein from a different source than from an MFR of animal skim milk. This process is a marked improvement over prior art processes for the preparation of nutritional products suitable for feeding toddlers, which have a high casein content, for example less than 10 wt % of the protein can be obtained from another source than from an MFR of animal skim milk. The present process greatly saves on drying of the toddlers nutritional product, by virtue of the inclusion of different ingredients which are all obtained from the same animal skim milk, such as the UFP originating from step (iv) and any NFP and/or ROR obtained as surplus stream in the manufacture of an infant formula base product from animal skim milk.

A further aspect of the invention is the infant formula base product obtainable by the process according to the invention, as described herein. A further aspect of the invention is the nutritional product suitable for feeding infants from 6-36 months of age, preferably toddlers, obtainable by the process according to the invention, as described herein.

EXAMPLES

The calcium, sodium, potassium, and magnesium contents were determined via atomic absorption spectrometric method (ISO 8070/IDF 119). The phosphorus content was determined via molecular absorption spectrometry (ISO 9874/IDF 42). The protein content (N*6.38) was determined with FT001/IDF 20-3, the casein content with IDF29-1/ISO17997-1:2004, the whey protein content (NCN, non-casein nitrogen*6.38) with FT003, and the non-protein nitrogen (as N) with FT419 IDF20 Part 4.

Example 1—Effect of Diafiltration (DF) on Microfiltration (MF) of Animal Skim Milk The effect of diafiltration volume relative to incoming skim milk, or skim milk feed volume, on the protein content and composition of the subsequent MF retentate was investigated. The results are depicted in table 1.

It was found that at diafiltration volumes above 200% of skim milk feed volume the total protein content increased; however the ratio of casein to whey protein above a diafiltration volume of 200% of skim milk feed was negatively affected as indicated by a decreased ratio of casein to whey protein. This effect could be linked to aspects of membrane fouling linked to maintaining a VCF of 3 relative to feed flow at higher diafiltration volumes.

TABLE 1

The effect of diafiltration volume relative to composition of the MFR stream

| MFR Composition | 200%** | 267% ** | 444%** | 600%** |
|---|---|---|---|---|
| total protein* | 75.65 | 80.93 | 82.25 | 84.51 |
| casein* | 69.77 | 74.46 | 73.55 | 73.92 |
| whey* | 5.84 | 6.45 | 8.7 | 10.62 |
| non-protein-nitrogen* | 0.15 | 0.15 | 0.14 | 0.11 |
| lactose* | 16.36 | 10.9 | 9.8 | 7.65 |
| ash* | 7.99 | 8.17 | 7.95 | 7.84 |

*content in g/100 g
**diafiltration volume as percentage of skim milk feed volume

Example 2—MF of Animal Skim Milk

Approximately 4800 kg of pasteurized (72° C.×15 s) bovine skim milk (Dairygold, Mitchelstown, Cork, Ireland) was subjected to microfiltration according to the invention, using a Profrac pilot filtration plant (SPX), equipped with two 8" 8038 spiral wound organic MF membranes in series (0.2 µm, total surface area 71.35 m$^2$) for crossflow filtration (Synder Filtration). The filtration process was carried out using a feed pressure of 0.3 bar and a loop pressure of 2 bar (Delta P 1.7 bar) at ~13° C., employing a volume concentration factor of three (VCF=3) and employing a diafiltration volume equivalent to 75% of permeate flow. Trial duration was 24 hrs producing a retentate enriched in micellar casein and a permeate enriched in whey protein. The mass balance of the feed, retentate and permeate streams and compositional analyses thereof are outlined in tables 2 and 3 respectively. The MFR had been enriched in protein to a level of >75 wt %, based on total dry weight (contains about 90 wt % casein based on total protein), and a total solids content of at least 10 wt %, based on total weight of the MFR. Lactose levels decreased to a level of ~15 wt %, based on total dry weight and mineral levels expressed as ash remained at 7.4 wt %, based on total dry weight. The MFP stream produced during MF was much lower in protein; ~12.3 wt %, based on total dry weight, which was shown to be primarily β-casein (data not shown). Lactose levels were very high at ~75 wt %, based on total dry weight, while the mineral content expressed as ash was at ~8.3 wt %, based on total dry weight. Monovalent ion levels for Na, K, Cl were high in the permeate stream, and polyvalent ion levels for Ca and P were high in the retentate stream, while magnesium was retained in both streams at similar levels.

Example 3—RO of the MF Permeate

A portion of the dilute MFP (~6400 kg; 1.79 wt % total solids (TS)) generated during microfiltration was concentrated to ~5.5 wt % TS content using a GEA Model F pilot filtration plant equipped with two 4" 3838 spiral wound organic RO membranes in series (Toray Filtration). The filtration process was carried out using a feed pressure of 23 bar and a loop pressure of 25 bar (Delta P 2 bar) at ~10° C., employing a volume concentration factor of approximately three (VCF=3.35). Filtration duration was ~16 hrs and 115 kg dry matter of a RO retentate enriched in whey protein, lactose and minerals was collected. The mass balance of the feed, retentate and permeate streams and compositional analyses thereof are outlined in tables 2 and 3 respectively. Compositional analyses of the ROR is equivalent to the values presented in table 3 for the MFP on a dry matter basis as the RO essentially removed only water, which in itself is suitable for recycling and use as diafiltration water for the incoming skim milk feed to step a.

TABLE 2

Mass balance for filtration steps

| Stream | Total Solids g/100 g | Total Mass kg | Dry Matter kg |
|---|---|---|---|
| Skim Feed | 8.74 | 4812 | 420.57 |
| MF Retentate | 10.67 | 1574 | 167.95 |
| MF Permeate | 1.79 | 13224 | 236.71 |
| RO Retentate (MFP) | 5.53 | 2085 | 115.29 |
| RO Permeate (MFP) | n/a | 4356 | n/a |
| UF Retentate (ROR) | 8.27 | 400 | 33.08 |
| UF Permeate (ROR) | 4.8 | 1671 | 80.23 |
| NF Retentate (UFR) | 19.86 | 112 | 22.23 |
| NF Permeate (UFR) | 1.2 | 216 | 2.59 |

TABLE 3

Compositional analysis of feed (SM), retentate (MFR) and permeate (MFP) streams

|  | SM | MFR | MFP |
|---|---|---|---|
| Total solid (g/100 g) | 8.74 | 10.67 | 1.79 |
| Protein (g/100 g dry matter) | 38.00 | 78.86 | 12.29 |
| Ash (g/100 g dry matter) | 7.82 | 7.32 | 8.31 |
| Casein (g/100 g dry matter) | 30.40 | 70.97 | 3.14 |
| Whey (g/100 g dry matter) | 7.60 | 7.89 | 9.15 |
| Lactose (g/100 g dry matter) | 52.10 | 8.27 | 74.96 |
| Na (mg/g dry matter) | 3.60 | 0.51 | 5.39 |
| K (mg/g dry matter) | 17.70 | 5.82 | 24.86 |
| Cl (mg/g dry matter) | 11.03 | 3.04 | 15.53 |
| Ca (mg/g dry matter) | 13.15 | 21.83 | 6.99 |
| Mg (mg/g dry matter) | 1.20 | 1.16 | 1.22 |
| P (mg/g dry matter) | 10.40 | 14.51 | 7.32 |

Example 4—UF of an MFP ROR, with Concomitant Concentration of the UFR by NF

The ROR of example 3 (2085 kg) was subjected to ultrafiltration (UF), using a Model F pilot filtration plant (GEA), equipped with two 4" 3838 spiral wound organic UF membranes in series (Synder Filtration), having a molecular weight cut off (MWCO) of 10 kDa. The UF process was carried out at 10° C., employing a volume concentration factor of approximately five (VCF=5.2), which resulted in a retentate (400 kg) wherein the whey proteins were concentrated and a permeate (1671 kg) comprising high levels of lactose and ash. Compositional analyses of the UF retentate and permeate streams are outlined in table 4.

The UFR stream comprised a protein content ~39 wt %, based on total dry weight, and had a total solids content of ~8.0 wt %, based on total weight of the UFR stream. Ash levels were reduced compared to the incoming MFP stream, as well as the lactose content, essentially the UFR stream comprised all true protein. The UFP stream was enriched in ash and lactose compared to both the MFP and the UFR and while the UFP comprised no true protein it did contain significant quantities of non-protein-nitrogen.

Subsequent concentration of the UFR to ~20 wt % TS was carried out using a Model F pilot filtration plant (GEA), equipped with two 4" 3838 spiral wound organic NF membranes in series (Synder Filtration), having a molecular weight cut off (MWCO) of 150-300 Da. The NF process was carried out at 10° C., employing a volume concentration factor of approximately three (VCF=2.9), which resulted in a retentate (112 kg) wherein the whey proteins were concentrated and a permeate (216 kg) comprising high levels of monovalent ions. Compositional analyses of the NF retentate stream is outlined in table 4. The mass balance for UFR, UFP, NFR and NFP are outlined in table 2.

TABLE 4

Compositional analysis of the retentate (UFR) and permeate (UFP) streams after UF, and the retentate (NFR) stream after NF

|  | UFR | UFP | NFR |
| --- | --- | --- | --- |
| Total solid (g/100 g) | 8.27 | 4.8 | 19.86 |
| Protein (g/100 g dry matter) | 38.64 | 3.24 | 40.97 |
| Casein (g/100 g dry matter) | 8.96 | n/a | 8.50 |
| Whey (g/100 g dry matter) | 29.68 | n/a | 32.49 |
| NPN (g/100 g dry matter) | 0.30 | 0.43 | 0.20 |
| Lactose (g/100 g dry matter) | 54.78 | 87.67 | 54.24 |
| Ash (g/100 g dry matter) | 6.58 | 9.09 | 4.79 |
| Na (mg/g dry matter) | 5.20 | 6.64 | 3.66 |
| K (mg/g dry matter) | 18.49 | 29.01 | 12.14 |
| Cl (mg/g dry matter) | 10.93 | 9.65 | 2.74 |
| Ca (mg/g dry matter) | 7.09 | 6.54 | 6.75 |
| Mg (mg/g dry matter) | 1.01 | 1.17 | 0.97 |
| P (mg/g dry matter) | 6.33 | 7.56 | 5.31 |

Example 5—Partial Demineralisation of the UFP

According to the invention and to improve the industrial feasibility of the design, it is preferred to perform a partial demineralization of the UFP stream. It is desirable to remove 70% of monovalent ions Na and K. It is also desirable to remove 60% of polyvalent ions P and Mg. The demineralization of the UFP is achievable through one or a combination of the following steps, removal of monovalent ions using a NF membrane having a MWCO of 150-500 Da, pH or temperature induced precipitation of calcium/magnesium salts as citrate and phosphate, or removal of monovalent and polyvalent ions by strong/weak anionic/cationic ion exchange resins or removal of monovalent and polyvalent ions by electrodialysis.

The composition of the UFP and the desirable demineralised UFP according to the invention are outlined in table 5, the demineralised UFP has reduced levels of non-protein nitrogen, ash and minerals compared to the incoming UFP feed, with increased levels of lactose expressed on a DM basis.

TABLE 5

Compositional analysis of feed UFP and desired demineralization level for the demineralized UFP

|  | UFP | Demineralised UFP |
| --- | --- | --- |
| Total solid (g/100 g) | 4.8 | 20 |
| Protein (g/100 g dry matter) | 3.24 | 1.30 |
| Casein (g/100 g dry matter) | n/a | n/a |
| Whey (g/100 g dry matter) | n/a | n/a |
| NPN (g/100 g dry matter) | 0.43 | 0.17 |
| Lactose (g/100 g dry matter) | 87.67 | 95.98 |
| Ash (g/100 g dry matter) | 9.09 | 2.73 |
| Na (mg/g dry matter) | 6.64 | 1.99 |
| K (mg/g dry matter) | 29.01 | 8.70 |
| Cl (mg/g dry matter) | 9.65 | 1.93 |
| Ca (mg/g dry matter) | 6.54 | 1.31 |
| Mg (mg/g dry matter) | 1.17 | 0.47 |
| P (mg/g dry matter) | 7.56 | 3.02 |

Example 6—Combining

The MFR and NFR streams are combined in an infant formula base product having a casein/whey protein weight ratio of 40/60. To achieve a macronutritional composition of a target infant formula base product as described in table 5, 35.5 kg of MFR and 108 kg of NFR liquid streams were blended to meet the required protein content and casein to whey ratio of an infant formula. The deficit in lactose content for an infant formula derived by blending the MFR and NFR streams is compensated for by blending the aforementioned streams with 158 kg of the demineralised UFP described in table 5. to To generate a complete macronutritional composition, preferably prebiotics and a fat blend are added.

It is clear that the infant formula base product produced closely matches the macronutritional requirements of the target formulation, and while some mineral levels fall below the target level, particularly calcium and chloride these can be easily increased after the combining step using salts thereof.

Furthermore, table 7 lists amino acids of an infant milk formula produced according to the invention expressed in % of human milk at a protein content of 2 g/100 kcal. It is clear that levels of cystine and tryptophan are increased compared to traditionally produced infant milk formula, while levels of threonine are reduced as no cheese whey derivatives are used according to the invention.

TABLE 6

Compositional analysis of an infant formula base product produced from blending of MFR UFR and demineralized UFP streams

|  | IMF (target) | IMF (Invention) |
| --- | --- | --- |
| Protein (g/100 g dry matter) | 11.2-12.5 | 11.8 |
| Carbohydrate (g/100 g dry matter) | 48.8-59.6 | 51.7 |
| Fat (g/100 g dry matter) | 27.9-30.8 | 29.2 |
| Ash (g/100 g dry matter) | 2.00-2.5 | 1.3 |
| Na (mg/100 g dry matter) | 120-180 | 149.46 |
| K (mg/100 g dry matter) | 490-730 | 568.10 |
| Cl (mg/100 g dry matter) | 300-450 | 133.39 |
| Ca (mg/100 g dry matter) | 400-600 | 270.76 |
| Mg (mg/100 g dry matter) | 35-55 | 40.31 |
| P (mg/100 g dry matter) | 230-340 | 265.37 |

TABLE 7

Analysis of essential amino acids in infant formulae produced according to the invention expressed as a percentage of human milk compared to traditionally produced infant milk formula

|  | Conventionally produced IMF | IMF produced according to the invention |
| --- | --- | --- |
| cystine | 93% | 105% |
| histidine | 124% | 137% |
| isoleucine | 108% | 126% |
| leucine | 123% | 140% |
| lysine | 155% | 167% |
| methionine | 195% | 229% |
| phenylalanine | 96% | 113% |
| threonine | 141% | 130% |
| tryptophan | 101% | 142% |
| tyrosine | 105% | 105% |
| valine | 119% | 145% |

Example 7—Valorization of the Incidental Milk Components According to the Invention as a Casein Protein Concentrate For every 1 tonne of infant formula produced according to the invention 759 kg dry matter (DM) of milk solids are produced as a surplus stream. These surplus streams include portions of the MFR, and UFP streams and as such also includes the surplus minerals removed during demineralization of the UFP. The composite blended stream is termed casein protein concentrate (CPC) and its composition is described in table 8. Compared to any of the previously described streams the CPC stream has the highest ash and mineral contents due to concentration of the surplus minerals removed from the UFP in this stream.

This stream is suitable for use as a protein source (primarily casein) in follow-on (FO) and growing-up milk (GUM) formulations whereby the macronutrional composition may be balanced by blending the CPC with sweet whey derivatives such as lactose, whey protein concentrate and demineralised whey, preferably along with prebiotics, fat blends and other micronutrients.

TABLE 8

Composition of a casein protein concentrate produced by blending all surplus milk materials according to the invention

|  | CPC |
| --- | --- |
| Casein (g/100 g dry matter) | 45.2 |
| Whey (g/100 g dry matter) | 5.0 |
| NPN (g/100 g dry matter) | 2.0 |
| Fat (g/100 g dry matter) | 1.1 |
| Lactose (g/100 g dry matter) | 36.1 |
| Ash (g/100 g dry matter) | 10.6 |
| Mineral content: |  |
| Na (mg/g dry matter) | 4.7 |
| K (mg/g dry matter) | 22.6 |
| Cl (mg/g dry matter) | 8.6 |
| Ca (mg/g dry matter) | 18.4 |
| Mg (mg/g dry matter) | 1.5 |
| P (mg/g dry matter) | 13.9 |

The invention claimed is:

1. A process for preparing a first nutritional product and a second nutritional product, the process comprising:
   (a) microfiltering (MF) animal skim milk over a membrane having a porosity of 0.10-0.35 micrometer and at a volume concentration factor of 1.5-8, resulting in a retentate (MFR) and a permeate (MFP), wherein the protein fraction of the MFR comprises at least 85 wt. % casein and less than 15 wt. % whey protein;
   (b) ultrafiltering (UF) the MFP over a membrane having a molecular weight cut-off of at most 25 kDa at a volume concentration factor of 1.5-8, resulting in a retentate (UFR) and a permeate (UFP);
   (c1) combining part of the MFR and the UFR to obtain a composition having a casein/whey protein weight ratio of 20/80-70/30 to prepare the first nutritional product;
   (c2) using the remainder MFR to prepare the second nutritional product;
   wherein:
   the first nutritional product is an infant formula base product; and
   the second nutritional product is a growing-up milk for a child of 12-36 months of age; and
   the second nutritional product comprises less than 50 wt. % of protein from a different source than the protein comprised in the MFR.

2. The process according to claim 1, wherein step (a) is enhanced with diafiltration, wherein the enhancement is diafiltration of the MFR at least one time with an amount of water and the resultant diafiltered MFR which is used as the MFR in steps (c1) and (c2), or by diluting the animal skim milk with an amount of water and subjecting the diluted animal skim milk to MF.

3. The process according to claim 1, wherein step (a) is performed over a ceramic membrane having a porosity of 0.10-0.30 micrometer or over a spiral wound organic membrane having a porosity of 0.10-0.35 micrometer.

4. The process according to claim 3, wherein step (a) is performed over a spiral wound organic membrane having a porosity of 0.15-0.25 micrometer.

5. The process according to claim 1, wherein step (a) is performed at a temperature from 5-25° C.

6. The process according to claim 1, further comprising:
   (d) demineralizing of at least part of the UFP, resulting in a demineralized UFP, wherein the demineralized UFP is combined in step (c1) with the MFR and the UFR to obtain a composition having a casein/whey protein weight ratio of 20/80-70/30 to prepare the first nutritional product.

7. The process according to claim 6, wherein the demineralizing comprises:
   (d1) nanofiltration (NF) of at least part of the UFP, resulting in a retentate (NF3R) and a permeate (NF3P);
   (d2) subjecting the NF3R to calcium phosphate salt precipitation;
   (d3) removing the precipitated salts, resulting in the demineralized UFP.

8. The process according to claim 1, further comprising:
   concentrating the UFR, resulting in a concentrated UFR which is used as UFR in step (c1).

9. The process according to claim 1, further comprising:
   concentrating the part of the MFR in step (c1), resulting in a concentrated MFR which is used as MFR in step (c1).

10. The process according to claim 1, further comprising:
    concentrating the MFP, resulting in a concentrated MFP which is used as MFP in step (b).

11. The process according to claim 1, further comprising spray-drying the combined product of step (c1).

12. The process according to claim 1, further comprising processing the combined product of step (c1) into an infant formula, follow-on formula or growing-up milk.

13. The process according to claim 1, further comprising: combining a part of the MFR with UFP.

14. The process according to claim 1, further comprising combining with a part of the MFR, UFP, and an NFP or an ROR, as obtained in any of optional steps (d), (e), (f) and (g):
    (d) demineralizing of at least part of the UFP, resulting in a demineralized UFP, wherein the demineralized UFP is combined in step (c1) with the MFR and the UFR to obtain a composition having a casein/whey protein weight ratio of 20/80-70/30 to prepare the first nutritional product,
    wherein the demineralizing comprises (d1) nanofiltration (NF) of at least part of the UFP, resulting in a retentate (NF3R) and a permeate (NF3P); (d2) subjecting the NF3R to calcium phosphate salt precipitation; and (d3) removing the precipitated salts, resulting in the demineralized UFP;
    (e) concentrating the UFR, resulting in a concentrated UFR which is used as UFR in step (c1);

(f) concentrating the MFR by reverse osmosis (RO), resulting in a concentrated MFR which is used as MFR in step (c1); and/or (g) concentrating the MFP, resulting in a concentrated MFP which is used as MFP in step (b).

15. The process according to claim 1, wherein the second nutritional product comprises less than 10 wt % of protein from a different source than the protein comprised in the MFR.

16. The process according to claim 1, wherein the diafiltration is performed with 50-500 wt % diafiltration water, based on the total volume of the animal skim milk used in step (a).

17. The process according to claim 7, wherein the removal of the precipitated salts is performed by filtration.

18. The process according to claim 8, wherein the concentrating the UFR is performed by nanofiltration (NF) over a membrane having a molecular weight cut-off of at most 500 Da, resulting in a retentate (NF2R) and a permeate (NF2P), wherein the NF2R is used as UFR in step (c1).

19. The process according to claim 9, wherein the concentrating the part of the MFR in step (c1) is performed by:
reverse osmosis (RO), resulting in a retentate (ROR) and a permeate (ROP); or ultrafiltration (UF) over a membrane having a molecular weight cut-off of at most 25 kDa and operating with a volume concentration factor of 1.5-5, resulting in a retentate (UF2R) and a permeate (UF2P),
wherein the UF2R or the ROR is used as MFR in step (c1).

20. The process according to claim 10, wherein the concentrating the MFP is performed by reverse osmosis (RO), resulting in a retentate (RO2R) and a permeate (RO2P), wherein the RO2R is used as MFP in step (b).

21. The method of claim 1, further comprising combining the growing-up milk with one or more ingredients selected from lactose, sucrose, fat, vitamins, minerals, prebiotics or probiotics.

* * * * *